3,525,730
CHLORINATED COPOLYMER OF TOLUENE AND
A POLYDIENE
Karl Nützel, Cologne-Stammheim, Klaus Hoehne, Leverkusen-Schlebusch, and Diez Heine, Leverkusen-Kueppersteg, Germany, assignors to Farbenfabriken Bayer Aktiengesellschaft, Leverkusen, Germany, a corporation of Germany
No Drawing. Filed Nov. 17, 1965, Ser. No. 508,370
Int. Cl. C08d 5/04; C08f 27/02
U.S. Cl. 260—94.7                5 Claims

ABSTRACT OF THE DISCLOSURE

A copolymer of polybutadiene or polyisoprene and toluene which is after-chlorinated and useful as a binder for lacquers.

---

The chlorination of natural rubber to form chlorinated rubber, which is a base material for highgrade lacquers, has been carried out industrially on a large scale for a long time. The following is an example of a process which has been followed:

Natural rubber is dissolved in suitable solvents, so that a 5% by weight solution is formed, the molecular weight of the natural rubber is degraded to the required value and chlorine is introduced at 40 to 80° C. for 25 to 30 hours until the chlorine content of the polymer has reached 66%. The solvent is thereafter removed by introducing the solution into hot water and the chlorinated rubber is stabilised and dried.

A number of solvents may be used for the chlorination of natural rubber, for example chloroform, hexachlorethane, tetrachlorethane, tetrachlorethylene, chlorinated benzene, ethylchloride, etc. However, in a large scale chlorination process only tetrachlormethane is satisfactory, since it is an excellent solvent for the polymer and for the chlorination product, and is completely inert in the process. This is essential to ensure an economic reuse of the solvent. Tetrachlormethane is easily removed by introducing the viscous solution into hot water and the small quantities which remain do not adversely affect the products, e.g. by causing evil smell, splitting off of HCl, etc. This may occur, though, when using e.g. hexochlorethane which boils at a higher temperature than water. As tetrachlorethane is only sparingly soluble in water, losses of solvent are small in contrast to e.g. chloroform. One unpleasant property of tetrachlormethane as a solvent for this process is a strong increase in the viscosity of the polymer solution during chlorination at a chlorine content of the natural rubber of about 50% by weight. This increase in viscosity considerably impedes the mixing of the solution, which is necessary to dissipate the heat of reaction and to ensure a good chlorine absorption. If the supply of chlorine is interrupted during this thickening period, serious difficulties can arise, since the viscous solutons can barely be handled. The viscosity drops again to normal when the chlorination is carried on.

1,4-cis-polyisoprene can be chlorinated in exactly the same way with the same difficulties. Polyisoprene with a non-uniform steric structure and copolymers of isoprene and other monomers have not yet been chlorinated. The chlorination of polybutadiene with uniform and non-uniform steric structure and also the chlorination of copolymers of butadiene and for example styrene was initially unsuccessful in tetrachlormethane, since soluble intermediates were obtained during the chlorination. Chlorination may also be effected in ethylchloride, chloroform, and chlorobenzene, but here also highly viscous intermediates are formed. This may be avoided only by particular modes of operation, for example by chlorinating in the presence of alkaline earth oxides. This necessity makes it difficult to carry out the process industrially. Chlorination in tetrachlormethane is also achieved successfully when working under pressure at 100° C. or with ultra-violet illumination. It is obvious that these methods cannot easily be worked on a technical scale. Therefore, no suitable technical process for chlorinating polybutadiene and copolymers of butadiene and styrene exist at the present time, despite the inexpensive starting material.

It is an object of this invention to transform polybutadienes and polyisoprenes, more especially the types of low viscosity, with predominantly an irregular steric structure, smoothly and without any formation of a highly viscous phase during chlorination in tetrachlormethane into chlorinated products. This object is achieved if elastomers are subjected to the chlorination which contain 2 to 40% and advantageously 6 to 30% of toluene in a condensed form. The double bond content (determined on the bromine number) of these elastomers is about 33 to 80% of the theoretical value of a pure polybutadiene. It is surprising that the chlorination velocity (particularly of the products of low molecular weight), was about 20 to 30% higher than that of natural rubber, at the same temperature, despite the reduced content of double bonds.

The finally clorinhated polymer unexpectedly provides a lighter coloured and clearer solution in xylene and a higher stability than comparable highly chlorinated natural rubber or polyisoprene, and lacquers produced from the new chlorinated elastomers are superior in practically all properties to those from chlorinated rubber and are even far superior in some properties.

Polybutadienes and polyisoprenes, or their copolymers, containing condensed toluene can for example be prepared by polymerising the monomers with triphenyl silyl potassium or sodium as catalysts in toluene or fluids containing toluene as solvents. In this polymerisation toluene reacts with the double bond of the polydiene and is thus incorporated chemically. The quantity of toluene condensed is dependent on the polymerisation conditions. In other respects this polymerisation is carried out in a manner known per se. The double bond content can drop to 30% of the theoretical value, depending on the toluene content. It is usually calculated by means of the bromine number or hydrogenation number. The exact toluene content can easily be calculated from the intensity of the band at 2610 A. in the ultra-violet spectrum, using extinction maximum of ethyl benzene or 1,4-diphenylbutane as a standard. (A solution of 1 g. in 100 ml. and a layer thickness of 1 cm. produces an extinction of 23.3 at the same position.)

The molecular weight of the polymer is controlled by means of the polymerisation temperature and the quantity of the catalyst as in other anionic polymerisation processes. The solvent and the monomer can be mixed and the catalyst added gradually, but the heat of polymerisation is more easily dissipated if the solvent and catalyst are initially supplied and the monomer is introduced gradually. The polymerisation reaction should be carried out in the absence of air and moisture; vessels, solvents and monomers should be free from oxygen, moisture and proton-active substances such as alcohol, acids, phenols, etc., in order to avoid an unnecessary consumption of catalyst. The polymerisation is stopped by adding alcohol or formic acid. Optionally an age resistor is introduced and the solvent is removed either by evaporation at first at room temperature and then in vacuo, or by introducing the solution into hot water or by pouring the solution in five times its quantity of ethyl alcohol. The yields are sometimes higher than 100%, based on the monomer.

This polymer, which may have a molecular weight of between 80 and 15,000, may then be dissolved in tetrachlormethane and the solution adjusted to a concentration between 8 and 15% by weight, the actual value depending on the molecular weight of the polymers. Chlorine is introduced at temperatures of about 10 to 100° C., preferably 40 to 70° C., absorption is immediate. The chlorine content of the polymer is constantly checked by taking samples. When the chlorine content is 50 to 70% by weight, preferably 65 to 67% by weight, normally after 15 to 20 hours, the supply of chlorine is stopped, the solution is freed from dissolved gases by boiling. There are several methods for recovering the polymer from this solution. These methods are essentially the same as used with other polymer solutions, e.g. introducing into hot water, emulsifying the solution in an aqueous medium (e.g. sodium carbonate solution of pH 9 to 10) and subsequent distilling of the tetrachlormethane at about 85° C. The chlorination product which is still in suspension may be bleached and stabilised.

The bleaching may be effected with any suitable bleaching agent, e.g. sodium hypochlorite. Stabilizers suitable for the products are all known stabilizers for rubber, e.g. alkaline earth salts of fatty acids (e.g. barium stearate), tin compounds, e.g. dibutyl tin laureate, dibutyl tin maleinate, dioctyl tin laureate, dioctyl tin maleinate and epoxides, e.g. epoxidised soya bean oil, diglycidyl ethers of bisphenol A, phenoxypropenoxide etc. After filtering, the product is dried. The yield is generally between 95 and 99%.

The chlorination is thus carried out to be as complete as possible. In this case the chlorine content will be about 65 to 67%. It is possible though to stop the chlorination at any point. Thus products may be obtained which contain any amount of chlorine up to 67%. Useful products are those containing from 50 to 67% of chlorine. The preferred products contain about 65 to 67% by weight of chlorine.

The fully chlorinated polymers of ethylene, isoprene, propylene and butadiene, their copolymers, and also fully chlorinated natural rubber, are inter alia relatively good binders for lacquers. Broadly speaking, however, they all have the following disadvantageous properties, which are more pronounced with the types of low molecular weight:

(a) low resistivity against splitting off HCl ("stability");
(b) limited compatability with oil-containing film formers (e.g. alkyd resins);
(c) strong tendency to yellowing;
(d) unsatisfactory spraying behaviour in compressed air spray pistols, which is caused by a filament formation of the lacquer.

For these reasons, only in exceptional cases, more especially in the low viscosity range, the fully chlorinated polymers are used as the only binders in lacquers. Normally they are added to other binders which contain drying oils (e.g. alkyd resins), but their utility is limited by their aforementioned disadvantageous properties, i.e. the insufficient compatability, the unsatisfactory spraying capacity, the strong tendency to yellowing and the low stability.

The chlorinated polymers which are produced by the process of this invention and more especially the types of low molecular weight do not show these disadvantages. Their spraying capacity is substantially better and their stability (resistance to splitting off HCl is considerably improved). Their yellowing tendency and the chalking tendency are also considerably reduced. Their far greater compatability with drying oils and alkyd resins, and with other resins used as lacquer binders, the improved elasticity of unplasticised films formed from them, together with the better properties already referred to broaden the utility of the products considerably. These fully chlorinated products may be used within certain limits as the only binders for lacquers. They can even be employed in stoving lacquers.

The following examples illustrate the new process. Parts and percentages indicated are by weight. Preparation of the polymer:

In a dry three-necked spherical flask, equipped with a stirrer device, reflux condenser and supply tube, there are placed 200 parts of toluene (water content >50 p.p.m.) and 3 parts of triphenylsilyl potassium, suspended in 10 parts of diethyl ether, are added. While stirring, 560 parts of butadiene are introduced as quickly as they are absorbed. The temperature rises quickly to 80° C., the yellow suspended catalyst dissolving with a ruby red colour. The temperature is kept at about +80° C. with a methanol-$CO_2$ bath (of −80° C.). After 60 minutes, the polymerisation is stopped by adding 10 parts of formic acid. The now colourless viscous solution is freed from the main quantity of the toluene in vacuo (20 mm. Hg) at 50° C. In order to remove residual traces of toluene (which would form benzaldehyde in the subsequent chlorination process), the polymer is heated for 8 hours at 100° C. at a pressure of 2 to 3 mm. Hg. The yield is 620 parts and is 111% of the monomer introduced. Ultra-violet analysis shows a toluene content of 19%, based on the total polymer.

EXAMPLE 1

150 parts of the polymer obtained according to the foregoing method are dissolved in 1150 parts of tetrachlormethane to form an 11.5% solution and introduced into a three-necked spherical flask, equipped with a stirrer device, reflux condenser and supply tube. The flask is heated to 50° C. and gaseous chlorine is introduced for 18 hours. At no phase of the chlorination is there any increase in viscosity. The chlorine content is determined by analysing a sample; it is 66.6%. 600 parts of chlorine (20% more than the expected theoretical amount) were consumed. The solution is briefly heated to boiling in order to remove dissolved gases. Then dilute soda solution is added while stirring quickly until the emulsion formed has a pH value of 9 to 10. Thereafter, the emulsion is introduced dropwise into hot water (85° C.) to remove tetrachlormethane. The suspension which forms is stabilized by adding barium stearate. The liquid is filtered off and the solid product dried at 75° C. in vacuo.

Yield, based on starting polymer: 437 parts=99%.
Viscosity of a 20% solution in a toluene-butanol mixture (5% butanol)=4.5 cp.
Colour number: 5 to 7.
Softening point: Is decomposed above 215° C.

Comparison example 67 parts of natural rubber are dissolved in 1305 parts of tetrachlormethane, introduced as described in Example 1 into a three-necked spherical flask, 1.5 parts of copper oleate are added and the mixture is degraded by introducing air. After about 15 hours, there is a marked increase in viscosity, which causes insufficient mixing. After another 4 hours, the viscosity is again normal. After chlorinating for 30 hours, its chlorine content is 65 to 66%. The solution is now degraded for 20 hours with a mixture of chlorine and air for further lowering of the viscosity. Thereafter, the procedure as described in Example 1 is followed.

Yield: 186 parts=99%.
Viscosity determined as in Example 1: 6 cp.
Colour number of the solution: 10 to 15.
Product is decomposed above 200° C.

EXAMPLE 2

88 parts of a polyisoprene, obtained in a manner similar to the foregoing method of production, are dissolved in 500 parts of tetrachlormethane. The 15% solution is chlorinated, as described in Example 1. After 20 hours, 630 parts of chlorine have been absorbed (150% more than the expected theoretical amount). The chlorine content is 66.4%. It is worked up as previously described.

The yield is 95% of the theoretical.
The viscosity determined as in Example 1: 2.6 cp.
The colour number of the solution: 2 to 4.
The product is decomposed above 198° C.

EXAMPLE 3

The preparation of a polybutadiene is so modified that a polymer of higher molecular weight is formed.

67 parts of this polybutadiene are dissolved in 750 parts of tetrachlormethane. The 8.3% solution is chlorinated as described in Example 1. After 20 hours the polymer has a chlorine content of 66.2%. At no phase of the chlorination is there formed a solution of high viscosity. The product is worked up as previously described.

The yield is 190 parts, the viscosity determined as in Example 1 is 36 cp., the colour number of the solution is 7 to 10. The product is decomposed above 200° C.

Comparison example 67 parts of natural rubber are dissolved in 1300 parts of tetrachlormethane and, as in the comparison part of Example 1, are decomposed for 25 hours and thereafter chlorinated. There is a relatively strong increase in viscosity, at a chlorine content of about 50 to 55% Mixing of this solution is very difficult. After 30 hours, the chlorine content is 65.8%. The chlorination is stopped and the chlorinated elastomer is worked up as described.

The yield is 179 parts, the viscosity determined as in Example 1 is 39 cp. and the colour number of the solution is 10 to 15.

The test for the resistance to splitting off HCl is carried out as follows:

A solution of 6 parts of the chlorinated product are dissolved in 14 parts of xylene and introduced into a test tube, which is immersed so far into an oil bath at a temperature of 100° C. that both liquid levels are in one plane. A strip of Congo paper is arranged at 5 cm. above the test solution. The time from immersing the test solution in the hot oil bath until the lower edge of the Congo paper turns blue is the standard for the stability of the product.

The stability of the chlorinated products is set out in Table 1.

TABLE 1

| Product: | Stability |
|---|---|
| According to Example 1 | 30' |
| According to comparison Example 1 | 10' |
| According to Example 2 | 22' |
| According to Example 3 | >6h. |
| According to comparison Example 3 | 40' |

The spraying capacity was tested as follows:

The chlorinated products were dissolved in xylene until a viscosity resulted which corresponds to a discharge time of 20" from a DIN 4 beaker. The solution is sprayed from a spray nozzle with a diameter of 1.8 mm. and a pressure of 2 atm. gauge. The products according to Examples 1, 2 and 3 show a spraying jet with a low mist formation, and the film has a satisfactory flow after the solvent has evaporated. The solutions of the products of the comparison parts of Examples 1 and 3 show "filament formation." The flow of the films after the solvent has evaporated is poor.

The light stability was tested as follows:

A solution of the chlorinated polymers in xylene was coated with a film-drawing device in a uniform layer thickness on white photographic paper and exposed to light with the Xenon test instrument. The products of the comparison parts of Examples 1 and 3 show a yellowing which can just be detected with the eye after 24 hours, by comparison with the unexposed films. The polybutadiene chlorinated according to Examples 1 and 3 only show this yellow colouring after 100 hours; the chlorinated polyisoprene, prepared according to Example 2, shows this yellowing after 54 hours.

The compatability was tested as follows:

(a) 10 parts of the chlorinated polymer according to Example 1 were introduced into 10 g. of linseed oil (as used in lacquers) and the mixture was heated to 90° C. while stirring. After 15 minutes, a clear, light-coloured solution was formed, which had a relatively low viscosity.

A chlorinated natural rubber of comparable viscosity was solved in about 30 minutes and produced a dark, turbid solution of much higher viscosity.

(b) A styrene-alkyd resin (prepared from 30% of styrene, 35% of a linseed oil, recinene oil mixture, 26% of phthalic anhydride and 9% of glycerine) is dissolved in xylene and mixed with the chlorinated polymer in the ratios of 1:4, 1:1 and 4:1. With all three ratios, clear films were formed. Clear films were not obtained in any case when using chlorinated natural rubber.

The resistance to chalking was tested as follows:

Two comparison lacquers were prepared, consisting of 19.2 parts of chlorinated polymer, 6.8 parts of chlorinated diphenyl, 2.9 parts of di-(phenoxyethyl)-formal, 1,6 parts of chlorinated terphenyl resin, 16.4 parts of titanium dioxide (rutile) and 6.8 parts of barite.

In one case, the chlorinated polymer was a low-viscosity chlorinated rubber (5 cp. in 20% solution of toluene), and in the second case, it was a chlorinated polybutadiene according to Example 1.

The lacquers were brushed on to sheet metal plates and subjected for 800 hours to treatment in a weather-ometer appliance. Whereas the chlorinated rubber lacquer shows a thick white chalky coating after this time and has become matted, the chlorinated polybutadiene lacquer according to Example 1 presented only a very much smaller chalky coating and still had a silky lustre.

We claim:

1. A chlorinated polydiene copolymer of (a) polybutadiene or polyisoprene and (b) toluene, said copolymer, prior to chlorination, containing from 2 to 40% by weight of toluene in copolymerized form and said chlorinated copolymer containing from 50 to 70% by weight of chlorine, based on the weight of said copolymer prior to chlorination.

2. The chlorinated polydiene copolymer of claim 1 wherein the amount of said chlorine is from 65 to 67% by weight.

3. The chlorinated polydiene copolymer of claim 1 wherein the polydiene is polybutadiene.

4. The chlorinated polydiene copolymer of claim 1 wherein the polydiene is polyisoprene.

5. The chlorinated polydiene copolymer prior to chlorination copolymer of claim 1 wherein the polydiene has a molecular weight between 800 and 15,000.

References Cited

UNITED STATES PATENTS

| 2,495,137 | 1/1950 | Rowland | 260—94.2 |
| 2,831,839 | 4/1958 | Canterino et al. | 260—82.1 |
| 2,943,988 | 7/1960 | Canterino | 204—163 |
| 3,098,058 | 5/1960 | Schweiker et al. | 260—45.5 |
| 3,244,758 | 3/1963 | Eberhardt | 260—668 |
| 3,268,475 | 8/1966 | Hoch et al. | 260—45.9 |
| 3,331,826 | 7/1967 | Talcott | 260—94.2 |
| 2,980,656 | 4/1961 | Jones et al. | 260—85.1 |

JOSEPH L. SCHOFER, Primary Examiner

W. F. HAMROCK, Assistant Examiner

U.S. Cl. X.R.

260—85.1, 94.2, 96